A. J. SMITH.
Bee Hive.
No. 49,563.
Patented Aug. 22, 1865.
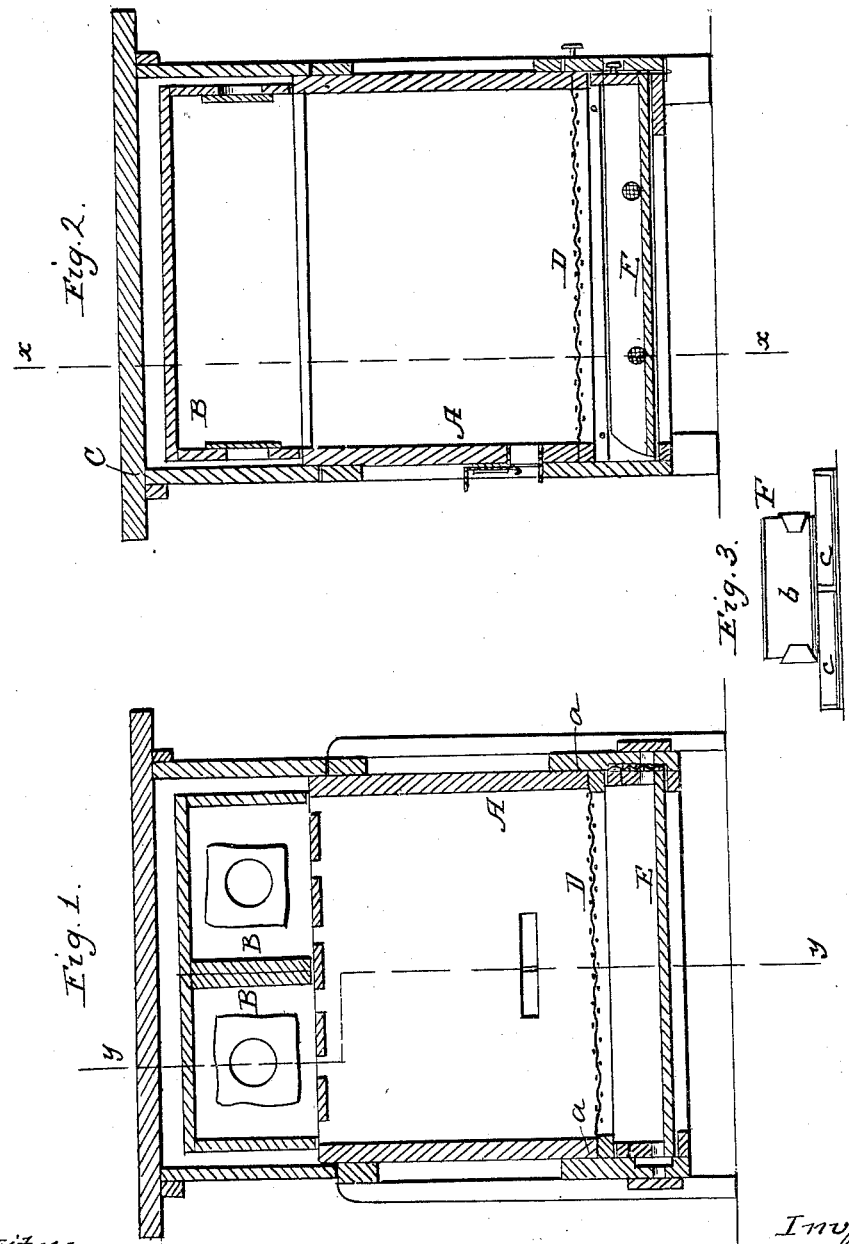

UNITED STATES PATENT OFFICE.

A. J. SMITH, OF WAYLAND, MICHIGAN.

IMPROVEMENT IN BEE-HIVES.

Specification forming part of Letters Patent No. 49,563, dated August 22, 1865.

*To all whom it may concern:*

Be it known that I, A. J. SMITH, of Wayland, in the county of Allegan and State of Michigan, have invented a new and Improved Bee-Hive; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $x\ x$, Fig. 2; Fig. 2, a vertical section of the same, taken in the line $y\ y$, Fig. 1; Fig. 3, a detached front view of the door to the bee-entrance.

Similar letters of reference indicate like parts.

This invention consists in a door of novel construction applied to the bee-entrance, as hereinafter described, whereby the entrance may be varied in capacity to allow the working bees to pass and prevent the passage of the drones and queen whenever desired.

A represents the hive, which may be constructed of the usual form, and provided with spare-honey boxes B and a cap or cover, C.

D represents a supplemental bottom, constructed of wire or other material in such a manner as to form a screen. This screen slides into the lower part of the hive, its sides or edges fitting in grooves $a$, which cover the sides, as shown clearly in Fig. 1.

E represents a wooden or close bottom, which is fitted in the hive directly below the screen-bottom. The screen-bottom admits of all the droppings of the bees and other filth passing through it, said droppings and filth being caught by the close bottom E, which may be drawn out from time to time and cleaned, and during summer the close bottom E may be withdrawn entirely or kept more or less open for the purpose of ventilation, the moth not being able to pass up through the screen, nor can the bees pass through it. This screen-bottom also is a guard against the ravages of the moth, as the litter of the hive all passes through it, and the moth can find no refuse in which to deposit her eggs. The newly-built comb is guarded by the bees, so that the moth can rarely find an opportunity to deposit her eggs in it. In winter the screen is removed and a space is allowed below the combs, and the droppings from the hive all fall free from the comb.

F, Fig. 3, represents the door which is placed at the orifice of the bee-entrance. This door is composed of three slides, $b\ c\ c$, the slide $b$ working vertically so as to enlarge or contract the entrance vertically, while the two slides $c\ c$ increase or diminish its length. By this arrangement the capacity of the bee-entrance may be varied as desired, the queen bee retained in the hive when required, and the drones kept in or out of the same, as necessity requires, while free ingress and egress may be allowed the workers. The slides may be constructed of tinned plate or thin sheet metal.

Having thus described my invention, I claim as new and desire to secure by Letters Patent—

The door composed of three slides or parts, $b\ c\ c$, arranged substantially as set forth.

A. J. SMITH.

Witnesses:
 WM. E. WHITE,
 JAMES E. WHITE.